Patented Nov. 25, 1941

2,263,990

UNITED STATES PATENT OFFICE 2,263,990

SEXUAL HORMONE COMPOUND AND PROCESS OF PRODUCING SAME

Fritz Johannessohn, Mannheim - Feudenheim, Erich Rabald, Mannheim-Waldhof, and Adolf Hagedorn, Mannheim, Germany, assignors to Rare Chemicals, Inc., Nepera Park, N. Y., a corporation of New York No Drawing. Application June 14, 1939, Serial No. 279,130. In Germany June 15, 1938

3 Claims. (Cl. 260—210)

Our invention relates to new compounds of hormones of the cyclopentanophenanthrene series and to processes of preparing same. It relates more particularly to phosphorylated glycosides of sexual hormones.

As it is well known, one obtains by etherification of sexual hormones of the cyclopentanophenanthrene series with sugars, substances which generally are characterised by valuable properties. Thus, they are physiologically more effective than the hormones free from sugar; furthermore they especially possess an activity of increased duration. Such glycosides are described for example in the United States Patent No. 2,088,792.

We have now found that the water solubility of the glycosides of sexual hormones of the cyclopentanophenanthrene series may be increased about ten times or even more without impairment of said physiological activity by transforming them to phosphoric ethers. This is of great importance for the therapeutic application of the hormone glycosides, the latter being soluble in water about 0.15% only.

Under sexual hormones of the cyclopentanophenanthrene series are to be understood those which possess the cyclopentanophenanthrene skeleton and at least one free hydroxy group. The skeleton may be saturated or may contain double bonds; in the latter case one ring may contain as many double bonds as possible in a benzene ring. To the above characterised group of hormones thus belong for instance androsterone, dehydroandrosterone, testosterone, androstendiol, pregnenolone, oestrone (follicle hormone), oestriol (follicle hormone hydrate), oestradiol, equiline, equilenine and others. The sugar component contained in the glycosides of such hormones may be derived of various kinds of mono- and disaccharides, as for instance glucose, fructose, galactose, lactose, etc.

The substances attainable according to our invention may be prepared either by direct phosphorylating of the glycosides or by phosphorylating the sugars and subsequently condensing the attained phosphorylated sugars with the sexual hormones, applying in the latter case for example methods as described in the United States Patent No. 2,088,792, i. e. by the action of phosphorylated acylglycosides on the free hormones in the presence of dehydrating reagents, for instance zinc chloride.

The phosphorylating may be performed according to the usual methods for the manufacture of phosphoric ethers. Thus, it may be brought about by means of phosphorus chlorides, especially phosphorus oxychloride in the presence of organic bases, e. g. quinoline, pyridine etc. Furthermore biological measures of phosphorylating are useful, for instance by treating the glycosides with solutions of phosphates in the presence of ferments which induce and favor the phosphorylating, e. g. by adding yeast or mucous membranes of intestines.

The condensation of phosphoric acid may take place with one or more hydroxy groups of the sugar component; however, on the other hand one or more glycosides may adhere to one molecule phosphoric acid. Furthermore, the two components need not be coupled in a stoichiometrical ratio, for example one portion of the glycoside in question may be substituted after the reaction by more phosphoric acid radicals than the other. In most cases, as we have found, only one molecule phosphoric acid is introduced into the glycoside molecule.

The new compounds are optically active and form white powders when entirely free from water, but even with only traces of water they form syrups. In substituting the acid hydrogen by metals of the group of the alkalis and alkaline earths, including ammonium and magnesium, one may attain salts which are likewise white powders and easily soluble in water.

By means of the glycosido-phosphoric acids it is possible to make aqueous solutions of the glycosides of sexual hormones, and one may procure even rather concentrated solutions thereof. Thus the sodium salt of the oestradiol glucosido-phosphoric acid is so easily soluble in water that one may prepare a 2% solution in respect to the oestradiol glucoside. The sodium salt of the testosterone glucosido-phosphoric acid is even more soluble so that one may easily prepare a watery solution which contains 6% testosterone glucoside. The physiological properties of the glycosides, e. g. degree and duration of the activity, are not diminished substantially by phosphorylating. Thus, the new compounds being also well tolerated, it is now possible to procure highly concentrated and effective watery solutions for injection.

Examples (1) 2.0 g. of oestradiol glucoside are dissolved in 120 g. of pyridine. While cooling with ice, an ice-cooled solution of 8 g. of phosphorus oxychloride in 40 cc. of pyridine is added, and the mixture is allowed to stand for 2 hours in darkness. Then an ice-cooled mixture of 40 cc. of water and 40 cc. of pyridine is added, whereupon allowed to stand for a further half an hour until the excess of phosphorus oxychloride is destroyed. Now the reaction mixture is shaken with 10 g. of silver carbonate and 10 g. of calcium bicarbonate, and filtered. The filtrate is evaporated thoroughly to dryness over phosphorus pentoxide in a vacuum at a temperature below 35° C. The calcium salt of the phosphorylated oestradiol glucoside is obtained so in the form of a white powder.

By adding lead acetate to the solution of the calcium salt in water the plumbate of the oestradial glucosidophosphoric acid is precipitated, which after washing is suspended in water and decomposed in the usual manner by hydrogen sulphide into lead sulphide and the free acid.

After filtering off the lead sulphide the filtrate is freed from hydrogen sulphide by nitrogen. By careful evaporating in vacuo the acid is obtained in a syrupy form, which changes to a glass-like mass when intensively dried over phosphorus pentoxide; by pulverizing this glass-like product one obtains therefrom a white hygroscopic powder. The oestradiol glucosido-phosphoric acid has a specific rotation of $[\alpha]^{22}_D = -27°$.

(2) By using oestrone glucoside as starting material, in place of oestradiol glucoside, and following the procedure as described in Example 1, oestron glucoside-phosphoric acid is obtained.

(3) 10 g. of phosphorus oxychloride are added to an ice-cooled solution of 3 g. of testosterone glucoside in 2,000 cc. of pyridine, and the mixture is allowed to stand an hour while cooling. After decomposing the surplus phosphorus oxychloride by adding small pieces of ice, the reaction mixture is brought to room temperature and shaken with 15 g. of silver carbonate and 15 g. of calcium bicarbonate. The further working up is performed as described in Example 1. The free testosterone glucosido-phosphoric acid forms a white powder of the specific rotation of $[\alpha]^{22}_D = +24°$.

(4) In the same manner as described in Example 3 the glucoside of dehydroandrosterone is phosphorylated.

(5) 5 g. of acetone dried yeast are finely triturated with 20 cc. of water and mixed with 20 cc. of a 1% aqueous suspension of oestradiol-3-glucoside. Then 3 cc. of a 0.15 molar phosphate solution are added, and the mixture adjusted to a pH of 7.4. After adding a few ccs. of toluene shake for 10 hours at 37°, whereupon filter and shake the filtrate with 10 g. of calcium bicarbonate. The mixture is again filtered, and the filtrate shaken out with chloroform. The watery phase is evaporated to dryness, and the remaining mixture of salts is dissolved in water. This solution is treated with lead acetate and worked up as described in Example 1.

(6) 3 g. of oestradiol galactoside are suspended in 400 cc. of phosphate buffer solution of a pH=6.8–7.1, and 8 g. of a substance obtained by carefully scraping off the mucous membrane of fresh intestines, are added. This mixture is shaken 20 hours at 37° C. in the absence of light and air. After filtration the still turbid solution is cleared by centrifuging and is then shaken with 30 g. of calcium bicarbonate, whereupon surplus bicarbonate and precipitated calcium phosphate are filtered off. To the filtrate dilute acetic acid is added whereby care must be taken that the solution remains completely or nearly neutral. Now basic lead acetate is added to the liquid, which contains sodium acetate, oestradiol galactosido-phosphoric sodium, whereby the insoluble lead salt of the oestradiol galactosido-phosphoric acid is formed. This salt is washed, suspended in water and decomposed by hydrogen sulphide. The filtrate of the formed precipitate is freed from hydrogen sulphide and neutralised by the corresponding quantity of sodium bicarbonate, calcium hydroxide, magnesium hydroxide or the like. The so obtained solution of the sodium salt, or calcium or magnesium salt, respectively, of the oestradiol galactosido-phosphoric acid is evaporated to dryness. The salts may be applied as such or be converted into the free acid as described in Example 1.

Various changes may be made in the details disclosed in the foregoing specification without departing from the invention or sacrificing the advantages thereof.

It will be understood therefore, that we do not intend to limit ourselves to the specific embodiment set forth except as indicated in the appended claims.

We claim:

1. The phosphorylated glycosides of sexual hormones of the cyclopentanophenanthrene series, being colorless powders when free from water, forming water soluble salts with metals of the group consisting of the alkali and alkaline earth metals, being optically active, having substantially the same physiological activity as the corresponding glycosides themselves and a much better solubility in water than the latter and the free hormones.

2. The testosterone glucosido-phosphoric acid, being a colorless powder when free from water, forming water soluble salts with metals of the group consisting of the alkali and alkaline earth metals, having a specific rotation of about $[\alpha]^{22}_D = +24°$, substantially the same physiological activity as testosterone glucoside itself and a much better solubility in water than the latter and the free hormone.

3. The oestradiol glucosido-phosphoric acid, being a colorless powder when free from water, forming water soluble salts with metals of the group consisting of the alkali and alkaline earth metals, having a specific rotation of about $[\alpha]^{22}_D = -27°$, substantially the same physiological activity as oestradiol glucoside itself and a much better solubility in water than the latter and the free hormone.

FRITZ JOHANNESSOHN.
ERICH RABALD.
ADOLF HAGEDORN.